United States Patent
Woo

(10) Patent No.: US 7,126,660 B2
(45) Date of Patent: Oct. 24, 2006

(54) IN-PLANE SWITCHING MODE LIQUID CRYSTAL DISPLAY DEVICE INCLUDING A BLACK MATRIX WITH SLIT AROUND THE PIXELS AND METHOD OF FABRICATING THE SAME

(75) Inventor: Joung-Won Woo, Gyeonggi-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 149 days.

(21) Appl. No.: 10/876,738

(22) Filed: Jun. 28, 2004

(65) Prior Publication Data

US 2004/0263753 A1    Dec. 30, 2004

(30) Foreign Application Priority Data

Jun. 30, 2003    (KR) ............... 10-2003-0043979

(51) Int. Cl.
  *G02F 1/1343*    (2006.01)
  *G02F 1/1333*    (2006.01)
(52) U.S. Cl. .............. 349/141; 349/110; 349/111
(58) Field of Classification Search ............ 349/110, 349/111, 141
  See application file for complete search history.

(56) References Cited

U.S. PATENT DOCUMENTS

| | | | |
|---|---|---|---|
| 5,721,599 A * | 2/1998 | Cheng ................. | 349/106 |
| 5,745,207 A | 4/1998 | Asada et al. ............... | 349/141 |
| 5,870,160 A * | 2/1999 | Yanagawa et al. .......... | 349/141 |
| 5,889,569 A * | 3/1999 | Okamoto et al. ........... | 349/110 |
| 6,124,910 A * | 9/2000 | Nishida et al. ............ | 349/110 |
| 6,288,763 B1 | 9/2001 | Hirota ....................... | 349/141 |
| 6,734,931 B1 * | 5/2004 | Yu ............................. | 349/106 |
| 2005/0134784 A1* | 6/2005 | Shibahara et al. .......... | 349/141 |
| 2005/0157239 A1* | 7/2005 | Yoo ............................ | 349/141 |

\* cited by examiner

*Primary Examiner*—Tarifur R. Chowdhury
*Assistant Examiner*—Paula Britton
(74) *Attorney, Agent, or Firm*—Morgan, Lewis & Bockius LLP

(57) ABSTRACT

An In-Plane Switching mode liquid crystal display device includes a first substrate and a second substrate, a plurality of gate lines and data lines defining a plurality of pixels on the first substrate, a driving device disposed in each of the plurality of pixels, at least one pair of a first electrode and a second electrode arranged in each of the plurality of pixels to generate a horizontal electric field, a black matrix formed on the second substrate and having a slot around the plurality of pixels, and a liquid crystal layer formed between the first substrate and the second substrate.

27 Claims, 4 Drawing Sheets

US 7,126,660 B2

IN-PLANE SWITCHING MODE LIQUID CRYSTAL DISPLAY DEVICE INCLUDING A BLACK MATRIX WITH SLIT AROUND THE PIXELS AND METHOD OF FABRICATING THE SAME

This application claims the benefit of Korean Patent Application No. 2003-043979, filed on Jun. 30, 2003, which is hereby incorporated by reference.

BACKGROUND OF THE INVENTION

1. Field of the Invention

The present invention relates to a liquid crystal display (LCD) device and a method of fabricating an LCD device, and particularly, to an In-Plane Switching mode LCD device and a method of fabricating the same.

2. Discussion of the Related Art

Recently, with the development of various portable electronic devices, such as mobile phones, PDAs, notebook computers, etc., a light, thin, small flat panel display device has been in great demand. Research and development are actively conducted for the flat panel display devices, such as an LCD, a PDP (Plasma Display Panel), an FED (Field Emission Display), a VFD (Vacuum Fluorescent Display), etc. Among these devices, the LCD attracts much more attention because of its simple mass-production technique, easy driving system, and implementation of a high picture quality.

There are various display modes for the LCD device according to arrangement of liquid crystal molecules. Currently, a TN (twisted nematic) mode LCD device is being generally utilized because of its easy black and white display, short response time, and low driving voltage. When a voltage is applied to the TN mode LCD device, liquid crystal molecules aligned to be horizontal to a substrate are aligned to be nearly perpendicular to a surface of the substrate. Accordingly, there is a problem in that a viewing angle is narrowed by refractive anisotropy of the liquid crystal molecules in applying of the voltage.

In order to solve this problem, LCD devices of various modes having wide viewing angle characteristics have been proposed. Among those, an In-Plane Switch (IPS) mode LCD device is applied to actual mass-production, and thus is being fabricated. This IPS mode LCD device forms a horizontal electric field that is substantially parallel to a surface of a substrate by forming at least one pair of electrodes arranged parallel in a pixel, so that liquid crystal molecules are aligned along the plane.

FIG. 1 is a schematic view of a structure of the above-mentioned IPS mode LCD device according to the related art. As shown in FIG. 1, a liquid crystal panel 1 has a pixel defined by a gate line 3 and a data line 4 that are disposed along lengthwise and widthwise directions. Although only the (n, m)$^{th}$ pixel is shown in FIG. 1, N (>n) gate lines 3 and M (>m) data lines are disposed in an actual liquid crystal panel, thereby forming N×M pixels over the entire liquid crystal panel 1. A thin film transistor 10 is formed at an intersection of the gate line 3 and the data line 4 in the pixel. The thin film transistor 10 includes a gate electrode 11 to which a scan signal is applied from the gate line 3, a semiconductor layer 12 formed on the gate electrode 11 and activated to form a channel layer when the scan signal is applied thereto, and a source electrode 13 and a drain electrode 14 formed on the semiconductor layer 12, to which an image signal is applied through the data line 4, thereby applying an image signal input from the outside to a liquid crystal layer.

A plurality of common electrodes 5 and a plurality pixel electrodes 7 are arranged substantially parallel to the data line 4 in the pixel. In addition, a common line 16 connected with the common electrode 5 is disposed in the middle of the pixel, and a pixel electrode line 18 connected with the pixel electrode 7 is disposed on the common line 16 and is thus overlapped with the common line 16.

As discussed above, in the related art IPS mode LCD device, the liquid crystal molecules are aligned substantially parallel to the common electrode 5 and the pixel electrode 7. When the thin film transistor 10 is operated and thus a signal is applied to the pixel electrode 7, an horizontal electric field that is substantially parallel to the liquid crystal panel 1 is generated between the common electrode 5 and the pixel electrode 7. The liquid crystal molecules are rotated along the same plane by the horizontal electric field, thereby preventing a gradation inversion due to refractive anisotropy. Here, a black matrix 32 serves to prevent light from being transmitted to an unwanted area, namely, an image non-displayed area.

The related art IPS mode LCD device having such a structure will now be described in more detail with reference to FIGS. 2A and 2B. Here, FIG. 2A is a cross-sectional view taken along I–I' of FIG. 1 to show a structure of the thin film transistor 10 according to the related art. FIG. 2B is a cross-sectional view taken along 11–11' of FIG. 1 to show a structure of a pixel according to the related art. In FIG. 2A, the thin film transistor 10 (in FIG. 1) includes the gate electrode 11 formed on a first substrate 20, a gate insulating layer 22 laminated over the entire surface of a first substrate 20, the semiconductor layer 12 formed on the gate insulating layer 22, the source electrode 13 and the drain electrode 14 formed on the semiconductor layer 12. In addition, a passivation layer 24 is formed over the entire surface of the first substrate 20. In FIG. 2B, the plurality of common electrodes 5 are formed on the first substrate 20 in a pixel, and the pixel electrode 7 and the data line 4 are formed on the gate insulating layer 22, so that a horizontal electric field is generated between the common electrode 5 and the pixel electrode 7.

The black matrix 32 and a color filter layer 34 are formed at a second substrate 30. The black matrix 32 serves to prevent light from leaking to an area where the liquid crystal molecules are not operated (namely, undesired area where an image is not displayed), and is usually formed at the thin film transistor 10 area (in FIG. 1) and between pixels (i.e., gate line and data line areas). The color filter layer 34 includes R (Red), B(Blue) and G(Green) colors to implement an actual color. A liquid crystal layer 40 is formed between the first substrate 20 and the second substrate 30, and then the liquid crystal panel 1 is thus completed. In addition, a black resin is usually utilized for the black matrix 32, and the reason thereof will now be described next.

The black matrix 32 made of metal, such as Cr or CrOx, that is usually utilized for the TN mode LCD or the like may form an electric field between the data line 4 and itself by its characteristic low resistance. Such an electric field is a vertical electric field that is formed between the first substrate 20 and the second substrate 30. Meanwhile, another electric field is formed between the pixel electrode 7 on the first substrate 20 and the common electrode 5 on the second substrate 30. As a result, the vertical electric field may not greatly affect the electric field between the pixel electrode 7 and the common electrode 5.

On the contrary, in the IPS mode LCD device, an electric field applied to the liquid crystal layer 40 is a horizontal electric field that is substantially parallel to a surface of the substrate 20 or 30. Accordingly, when the horizontal electric field is formed by the black matrix 32, the vertical electric field affects the horizontal electric field, thereby distorting the horizontal electric field. Such distortion may cause a vertical cross talk on a screen as a main factor of image quality deterioration. Accordingly, in the IPS mode LCD device, a black resin with high resistance is usually utilized as the black matrix 32 to prevent distortion of the horizontal electric field. However, there exist several problems because of disadvantages of the black resin itself.

First, since the resin has a bad anisotropy etching characteristic compared to metal in a photolithography, it is difficult to form the black matrix 32 with a fine pattern to make good resolution. Accordingly, it is difficult to fabricate an IPS mode LCD of high resolution.

Second, since the black matrix 32 has a low light blocking rate compared to Cr or CrOx (because transmittance of light is high), its thickness has to be thick compared to Cr or CrOx in order to completely block light transmitted to the image non-displayed area. Accordingly, a step is generated at the color filter layer 34 and makes it difficult to be flat.

Finally, since the black resin has a bad dispensability compared to the metal, such as Cr or CrOx, a protrusion is easily formed at a surface of the black matrix 32 compared to Cr or CrOx. Thus, defection occurs at the black matrix 32, thereby degrading a yield of the LCD.

SUMMARY OF THE INVENTION

Accordingly, an object of the present invention is to provide an In-Plane Switching mode LCD device and a method of fabricating the same that substantially obviates one or more problems due to limitations and disadvantages of the related art.

An object of the present invention is to provide an In-Plane Switching mode LCD device and a method of fabricating the same capable of forming a fine pattern and improving a yield by forming a black matrix as a metal layer.

Another object of the present invention is to provide an In-Plane Switching mode LCD device and a method of fabricating the same capable of preventing a vertical cross talk from occurring by electrically isolating a black matrix formed at each pixel from a neighboring pixel and thus minimizing distortion of a horizontal electric field.

To achieve these and other advantages and in accordance with the purpose of the present invention, as embodied and broadly described herein, there is provided an In-Plane Switching mode LCD device including a first substrate and a second substrate, a plurality of gate lines and a data lines formed on the first substrate and defining a plurality of pixels, a driving device disposed in each pixel of the first substrate, at least one pair of a first electrode and a second electrode arranged in each pixel of the first substrate and forming a horizontal electric field, a black matrix formed at the second substrate and having a slit around the pixel, and a liquid crystal layer formed between the first substrate and the second substrate.

In another aspect, an In-Plane Switching mode LCD device includes a first substrate and a second substrate, a plurality of gate lines and data lines defining a plurality of pixels on the first substrate, a driving device disposed in each of the plurality of pixels, at least one pair of first electrode and second electrode arranged in each of the plurality of pixels to generate a horizontal electric field, a black matrix formed on the second substrate and electrically isolated from a neighboring pixel, and a liquid crystal layer formed between the first substrate and the second substrate.

In another aspect, a method of fabricating an In-Plane Switching mode LCD device includes forming a plurality of gate lines and data lines defining a plurality of pixels on a first substrate, deposing a driving device on each of the plurality of pixels, arranging at least one pair of a first electrode and a second electrode on each of the plurality of pixels to generate a horizontal electric field, forming a black matrix having a slit around the plurality of pixels on a second substrate, and forming a liquid crystal layer between the first substrate and the second substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
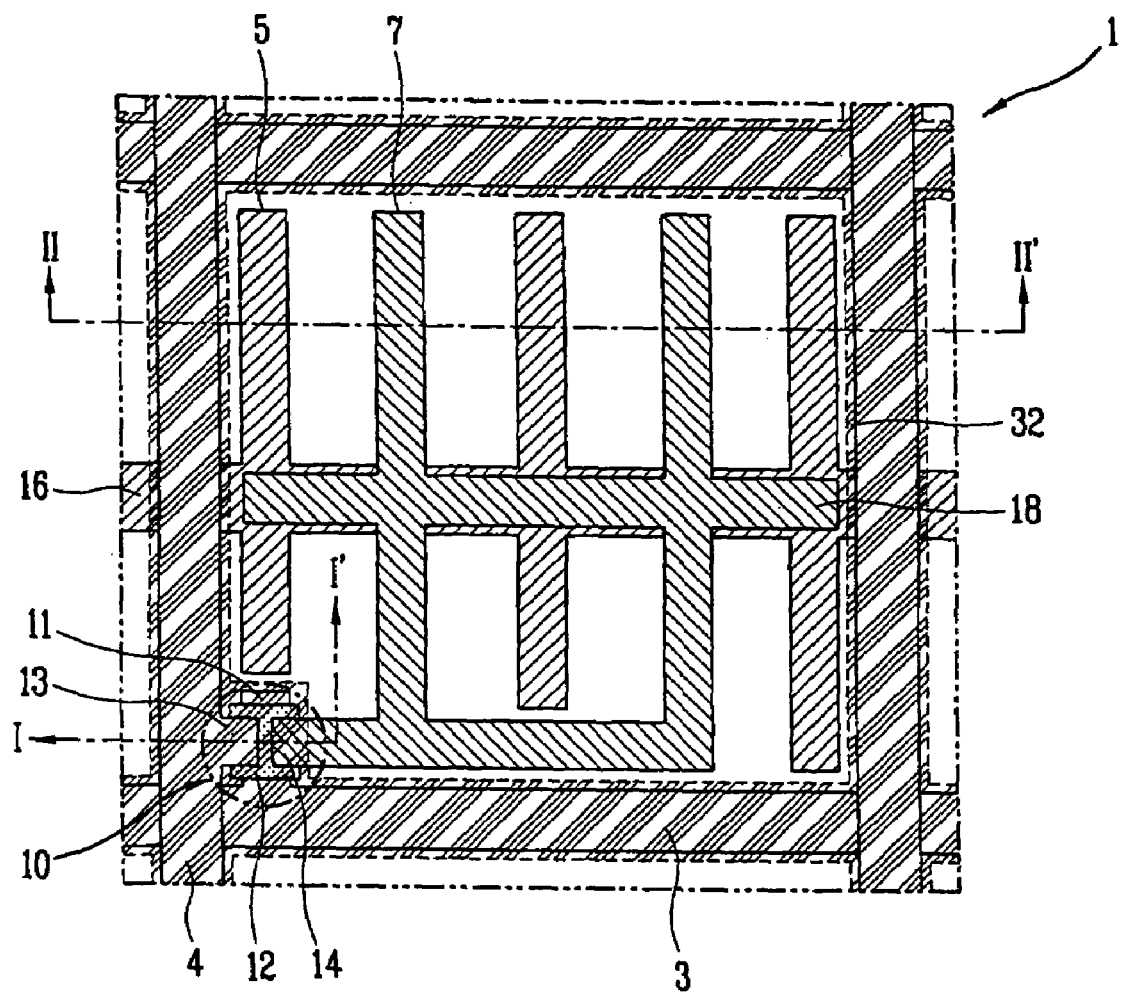
FIG. 1 is a schematic plane view of an IPS mode LCD device according to related art.
Figure 2A:
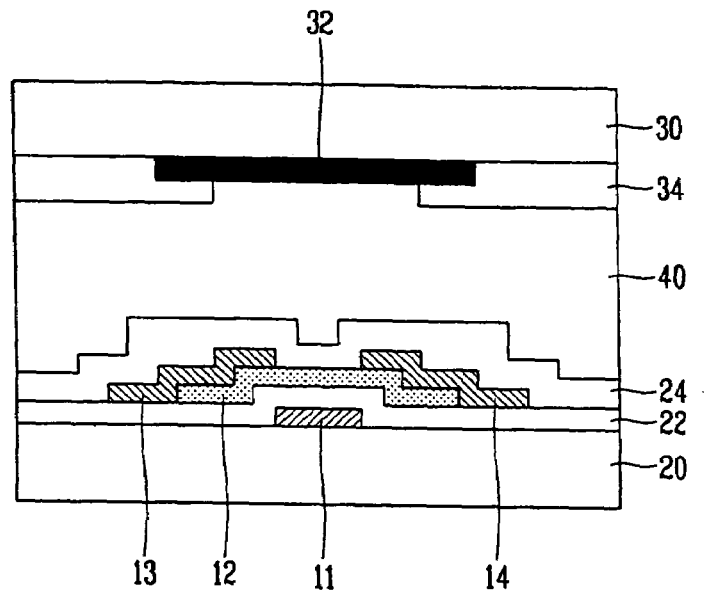
FIG. 2A is a cross-sectional view taken along I–I' of FIG. 1 according to related art.
Figure 2B:
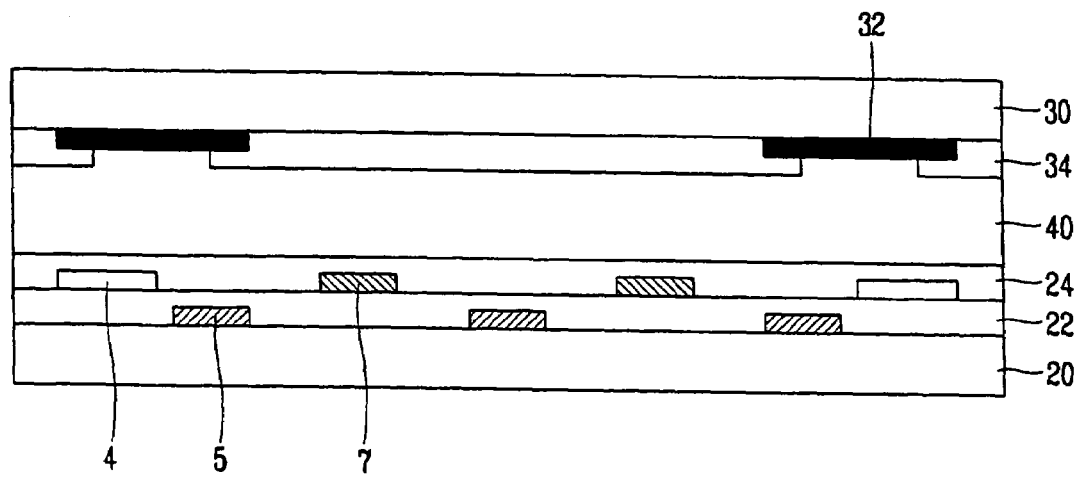
FIG. 2B is a cross-sectional view taken along II–II' of FIG. 1 according to related art.
Figure 3A:
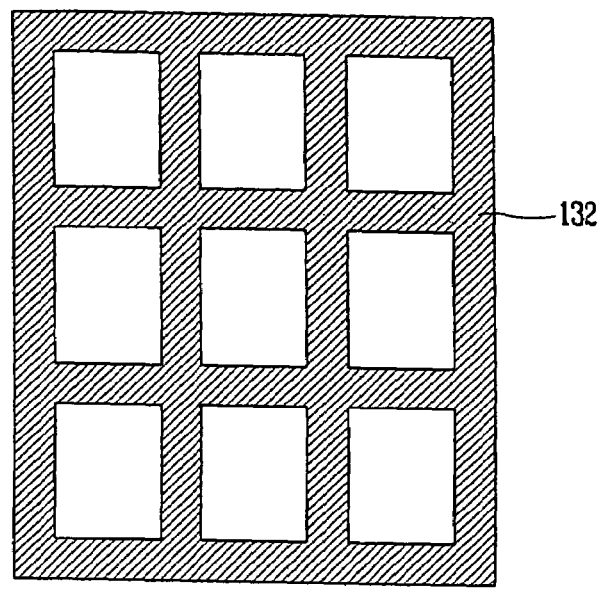
FIG. 3A is a schematic plan view of an exemplary black matrix of an IPS mode LCD device according to the present invention.

FIG. 3A is a schematic plan views of an exemplary black matrix of an IPS mode LCD device according to the present invention. In FIG. 3A, a black matrix 132 formed on a second substrate 130 (of FIG. 5) is integrally formed over the entire surface of the second substrate 130. Thus, in a case where the black matrix 132 made of metal of low resistance is integrally formed over the entire pixel, the entire black matrix 132 operates as one metal layer, thereby forming relatively large parasitic capacitance. Accordingly, an intensity of a vertical electric field formed by the black matrix 132 and a data line 104 (of FIG. 4) is increased, thereby distorting a horizontal electric field. Furthermore, during a vertical blanking period of an image signal input to the data line 104, a time for an electric charge at the parasitic capacitance to be discharged is lengthened. Hence, the vertical electric field that distorts the horizontal electric field during a next image signal period becomes stronger.

In addition, if the metal black matrix 132 is integrally formed over the entire pixel, the pixels are mutually affected by each other. For example, when an image signal is applied along the data line 104 (in FIG. 5), a vertical electric field is formed even at a pixel to which a weak image signal is currently applied by a strong signal of another pixel, thereby distorting the vertical electric field.

According to the present invention, the above-mentioned problems can be solved by electrically isolating the black matrix 132 made of metal pixel by pixel. That is, by limiting the influence of the vertical electric field in each pixel to only a corresponding pixel, intensity of the vertical electric field is minimized. Accordingly, the distortion of the horizontal electric field due to the vertical electric field can be prevented. Thus, the vertical electric field is formed in the corresponding pixel by the black matrix 132. However, the influence due to other pixels is excluded, so that the generated vertical electric field almost does not affect the horizontal electric field.

Figure 3B:
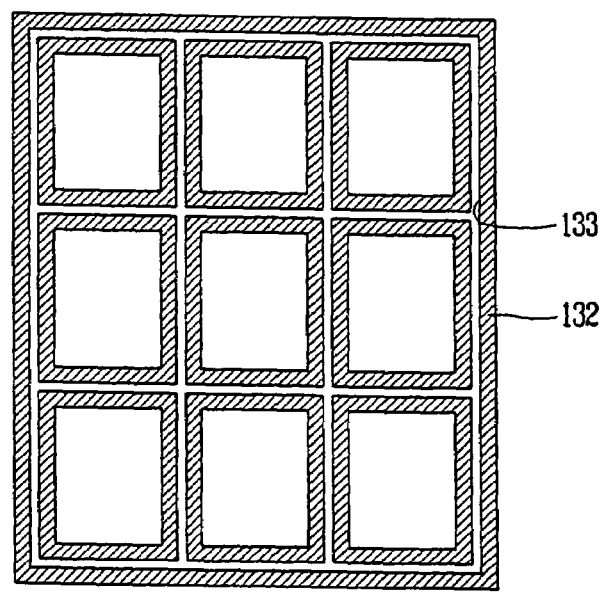
FIG. 3B is a schematic plan view of an exemplary black matrix of an IPS mode LCD device according to the present invention.

FIG. 3B is a schematic plan views of an exemplary black matrix of an IPS mode LCD device according to the present invention. In FIG. 3B, the black matrix 132 formed at an edge of each pixel (i.e, an area where data and gate lines are formed) is electrically insulated from the black matrix 132 at a neighboring pixel. The black matrix 132 may be formed by removing a predetermined central portion of the black matrix 132 (in FIG. 3A). Since the black matrix 132 is formed by laminating a metal layer and then patterning it, the central portion is not substantially removed. Thus, the central portion where the black matrix has been removed may be referred to as a removal area or slit 133 formed at the black matrix 132.

FIG. 3B, a width of the black matrix 132 (including width of slit 133) is formed to be almost the same as that of the black matrix 132 (in FIG. 3A). Accordingly, in view of the slit 133, the actual area of the black matrix 132 is decreased, thereby decreasing intensity of a vertical electric field formed between itself and the data line. Accordingly, the distortion of the horizontal electric field can be minimized.

Figure 4:
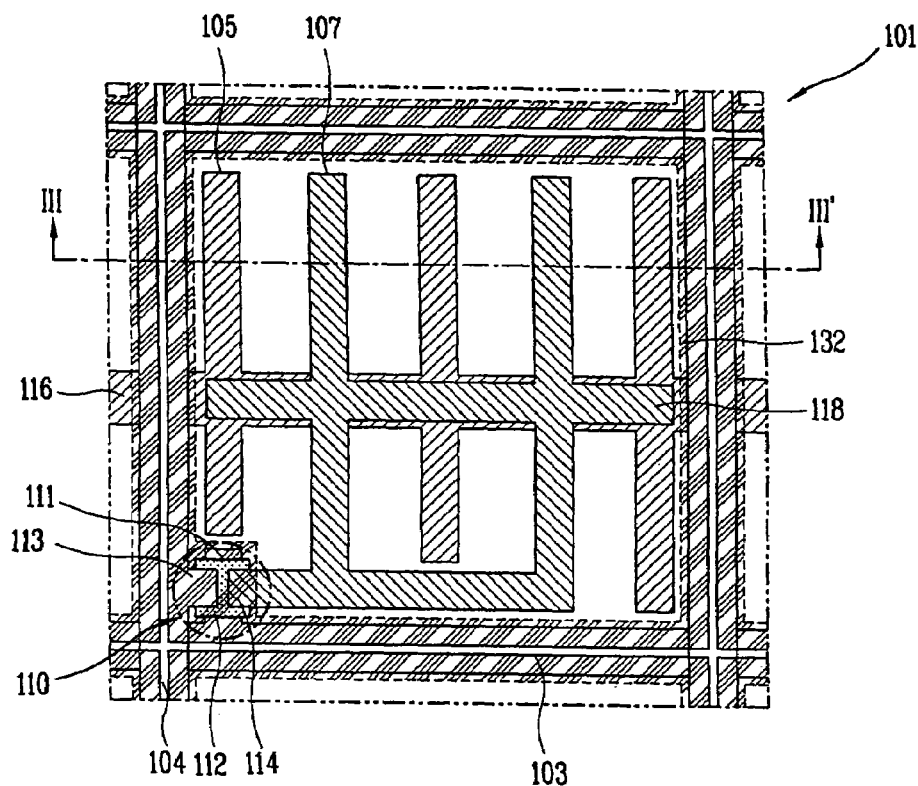
FIG. 4 is a schematic plan view of an exemplary IPS mode LCD device according to the present invention.
Figure 5:
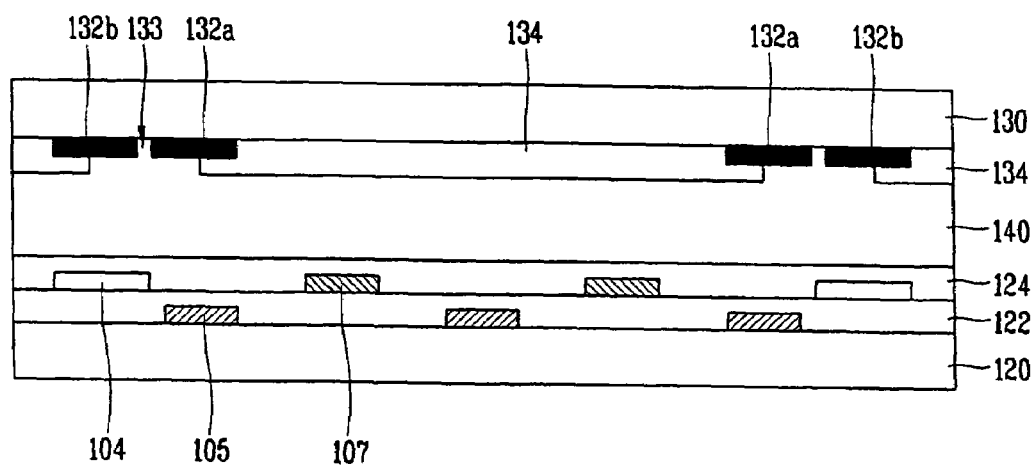
FIG. 5 is a cross-sectional view taken along III–III' of FIG. 4 according to the present invention.

FIG. 4 is a schematic plan view of an exemplary IPS mode LCD device according to the present invention, and FIG. 5 is a cross-sectional view taken along III–III' of FIG. 4. In FIG. 4, a gate line 103 and the data line 104 defining a pixel are arranged in a liquid crystal panel 101. A thin film transistor 110 is formed at an intersection of the gate line 103 and the data line 104 in the pixel. At least one pair of a common electrode 105 and a pixel electrode 107 arranged substantially parallel to the data line 104 are disposed in the pixel, and form a horizontal electric field that is substantially parallel to a surface of the liquid crystal panel between the common electrode 105 and the pixel electrode 107 when a signal is applied to the pixel electrode 107 through the thin film transistor 110. Also, a common line 116 connected with the common electrode 105 and a pixel electrode line 118 connected with the pixel electrode 107 are disposed in the pixel. The common line 116 and the pixel electrode line 118 are overlapped with each other, thereby forming storage capacitance.

The black matrix 132 made of metal, such as Cr, CrOx, Cr/CrOx or the like is formed at an edge of the pixel, where the gate and date lines 103, 104 and the thin film transistor 110 are formed. The slit 133 (in FIG. 5) with a predetermined width is formed in the black matrix 132, thereby separating the black matrix 132 of a corresponding pixel from the black matrix 132 of a neighboring pixel. In FIG. 4, the width of the slit 133 is not limited if the black matrix 132 of the corresponding pixel can be electrically isolated from that of the neighboring pixel. Since the black matrix 132 is made of metal having good etching anisotropy, a desired width of the slit 133 may be formed.

In FIG. 5, the common electrode 105 and the pixel electrode 107 are respectively formed on a first substrate 120 and a gate insulating layer 122 made of a transparent insulating material, such as glass or the like. Even though not shown in FIG. 5, a gate electrode 111 is formed on the first substrate 120, a semiconductor layer 112 is formed on the gate insulating layer 122, and a thin film transistor 110 is formed on the semiconductor layer 122 when a source electrode 113 and a drain electrode 114 are formed. A passivation layer 124 is formed on the source electrode 113 and the drain electrode 114.

The black matrix 132 and a color filter layer 134 are formed on the second substrate 130 made of glass or the like. As mentioned above and shown in FIG. 5, the black matrix 132 (132a, 132b) is formed by etching Cr, CrOx, Cr/CrOx or the like by photolithography, forming the slit 133 with a predetermined width, so that a corresponding pixel is electrically isolated from other pixels. By such electrical isolation, an actual black matrix-formed area is decreased, and the black matrix 132a of the corresponding pixel is not affected by the black matrix 132b of the neighboring pixel. Accordingly, a vertical electric field between the data line 104 and the black matrix 132a of the corresponding pixel is decreased.

In FIG. 5, the slit 133 is formed around the pixel. Since the slit 133 is an area where no black matrix is formed, light is directly leaked. Therefore, preferably, the slit 133 is formed along the gate line 103 and the data line 104 that define a pixel, to thereby prevent leakage of light. In FIG. 5, the black matrix 132 is formed so as to block only the data line 104 (or the gate line 103). But the black matrix 132 may be formed to block the data line 104 and the common electrode 105 disposed near the data line 104. The common electrode 105 is disposed near the data line 104 in order to prevent distortion of the horizontal electric field due to the data line 104 and the pixel electrode 107 by shielding therebetween with the common electrode 105. Accordingly, since a space between the data line 104 and the common electrode 105 becomes an image non-displayed area where the horizontal electric field is not applied, the black matrix 132a may be enlarged to the common electrode 105. Even though not shown, an overcoat layer may be formed on the color filter layer 124 in order to protect the color filter layer 124 and improve flatness. Finally, by forming a liquid crystal layer 140 between the first substrate 120 and the second substrate 130, an IPS mode LCD device is thus completed.

In general, since Cr, CrOx or the like has a good light blocking property, light can be effectively blocked even with a film having a thin thickness. Accordingly, in the IPS mode LCD device in accordance with the present invention, the black matrix 132 can be formed to have a thin thickness, so that flatness of the second substrate 130 can be improved. In addition, a step between the slit 133 and the black matrix 132 (132a, 132b) can be minimized.

The black matrix 132 in accordance with the present invention may be made of metal other than Cr, CrOx, Cr/CrOx or the like. That is, any kind of metal may be used for the black matrix in accordance with the present invention, if it has a good light blocking property and processability (etching anisotropy). In addition, while a specific structure of the IPS mode LCD device has been described, those descriptions are for explaining the present invention, not for limiting the present invention. For example, in FIG. 5, the common electrode 105 and the pixel electrode 107 are respectively formed on the first substrate 120 and the gate insulating layer 122. However, the common electrode 105 and the pixel electrode 107 may be respectively formed on the gate insulating layer 122 and the first substrate 120. In addition, both of the common electrode 105 and the pixel electrode 107 may be formed on the passivation layer 124 or on the first substrate 120. Metal for forming the common electrode 105 and the pixel electrode 107 is not also limited to a specific metal. Also, the data line 104, the common electrode 105 and the pixel electrode 107 may be shaped as a zigzag form.

As described above, in the IPS mode LCD device in accordance with the present invention, the black matrix 132 for preventing leakage of light is formed as a metal layer, so that the black matrix 132 can be formed with a fine pattern. Accordingly, the IPS mode LCD device having a high resolution can be fabricated.

In addition, since Cr, CrOx or the like used for the present invention has a good light blocking rate compared to a black resin, even though a metal layer made of Cr, CrOx or the like has a relatively thin thickness, light transmitting a liquid crystal layer can be effectively blocked. Accordingly, the black matrix 132 with a thin thickness can be realized, and a step can be prevented from being generated.

Furthermore, in the present invention, the distortion of the horizontal electric field applied to the liquid crystal layer 140 can be minimized by separating the black matrix 132a formed in one pixel from the black matrix 132b formed in a neighboring pixel. Hence, the vertical cross talk due to the distortion of the horizontal electric field can be prevented from occurring.

In the present invention, a fine pattern can be formed, a color filter layer can be flattened, no step is generated, and the quality of a black matrix is not degraded. Further, a black matrix which can prevent a vertical cross talk from being generated by a horizontal electric field distortion between a common electrode and a pixel electrode is provided. Furthermore, since such a black matrix is formed, an IPS mode LCD device having improved quality and an improved yield can be fabricated.

Therefore, in the present invention, a black matrix is formed as a metal layer of Cr, CrOx, Cr/CrOx or the like. Since the metal has good etching anisotropy, a fine line width may be formed and thus the black matrix having a fine pattern may be formed by being made of Cr, CrOx, Cr/Ox or the like. In addition, since the metal layer of Cr, CrOx, Cr/CrOx or the like has a good light blocking rate, light transmitting a liquid crystal layer may be effectively blocked even with the metal layer having thin thickness. Accordingly, the black matrix with a thin thickness can be formed. Meanwhile, in the present invention, by separating the black matrix formed in one pixel from another black matrix formed in a neighboring pixel, the black matrix in each pixel is electrically isolated from the outside.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An In-Plane Switching mode liquid crystal display (LCD) device, comprising:
a first substrate and a second substrate;
a plurality of gate lines and data lines defining a plurality of pixels on the first substrate;
a driving device disposed in each of the plurality of pixels;
at least one pair of a first electrode and a second electrode arranged in each of the plurality of pixels to generate a horizontal electric field;
a black matrix formed on the second substrate and having a slit around the plurality of pixels wherein the slit is continuously formed in the black matrix; and
a liquid crystal layer formed between the first substrate and the second substrate.

2. The In-Plane Switching mode LCD device of claim 1, further comprising a color filter layer formed on the second substrate.

3. The In-Plane Switching mode LCD device of claim 1, wherein the driving device comprises:
a gate electrode formed on the first substrate;
an insulating layer formed on the gate electrode;
a semiconductor layer formed on the insulating layer; and a thin film transistor including a source electrode and a drain electrode formed on the semiconductor layer.

4. The In-Plane Switching mode LCD device of claim 1, further comprising:
a first line to which the first electrode is connected; and
a second line to which the second electrode is connected and overlapping with the first line to form a storage capacitance.

5. The In-Plane Switching mode LCD device of claim 1, wherein the slit includes at least one part formed along the gate line and the data line.

6. The In-Plane Switching mode LCD device of claim 1, wherein the black matrix is formed of metal.

7. The In-Plane Switching mode LCD device of claim 6, wherein the black matrix is one of a Cr layer and a CrOx layer.

8. The In-Plane Switching mode LCD device of claim 6, wherein the black matrix is the Cr/CrOx layer.

9. The In-Plane Switching mode LCD device of claim 1, wherein the first and second electrodes have substantially zigzag shape.

10. The In-Plane Switching mode LCD device of claim 1, wherein the data lines have substantially zigzag shape.

11. An In-Plane Switching mode LCD device, comprising:
a first substrate and a second substrate;
a plurality of gate lines and data lines defining a plurality of pixels on the first substrate;
a driving device disposed in each of the plurality of pixels;
at least one pair of first electrode and second electrode arranged in each of the plurality of pixels to generate a horizontal electric field;
a black matrix formed on the second substrate and electrically isolated from a neighboring pixel wherein the black matrix includes a slit that is continuously formed therein; and
a liquid crystal layer formed between the first substrate and the second substrate.

12. The In-Plane Switching mode LCD device of claim 11, wherein the black matrix includes the slit formed around the plurality of pixels.

13. The In-Plane Switching mode LCD device of claim 12, wherein the slit includes at least one part formed along the gate line and the data line.

14. The In-Plane Switching mode LCD device of claim 11, wherein the black matrix is one of a Cr layer and a CrOx layer.

15. The In-Plane Switching mode LCD device of claim 11, wherein the black matrix is the Cr/CrOx layer.

16. The In-Plane Switching mode LCD device of claim 11, wherein the first and second electrodes have substantially zigzag shape.

17. The In-Plane Switching mode LCD device of claim 11, wherein the data lines have substantially zigzag shape.

18. A method of fabricating an In-Plane Switching mode LCD device, comprising:
forming a plurality of gate lines and data lines defining a plurality of pixels on a first substrate;
deposing a driving device on each of the plurality of pixels;
arranging at least one pair of a first electrode and a second electrode on each of the plurality of pixels to generate a horizontal electric field;
forming a black matrix having a slit around the plurality of pixels on a second substrate wherein the slit is continuously formed in the black matrix; and
forming a liquid crystal layer between the first substrate and the second substrate.

19. The method of claim 18, further comprising forming a color filter layer on the second substrate.

20. The method of claim 18, wherein forming the driving device comprises:
forming a gate electrode on the first substrate;
forming an insulating layer on the gate electrode;
forming a semiconductor layer on the insulating layer; and
forming a thin film transistor including a source electrode and a drain electrode on the semiconductor layer.

21. The method of claim 18, further comprising:
arranging a first line to which the first electrode is connected; and
arranging a second line to which the second electrode is connected and to overlap with the first line to form storage capacitance.

22. The method of claim 18, wherein the slit is formed with at least one part along the gate line and the data line.

23. The method of claim 18, wherein the black matrix is formed of metal.

24. The method of claim 23, wherein the black matrix is one of a Cr layer and a CrOx layer.

25. The method of claim 24, wherein the black matrix is the Cr/CrOx layer.

26. The In-Plane Switching mode LCD device of claim 18, wherein the first and second electrodes have substantially zigzag shape.

27. The In-Plane Switching mode LCD device of claim 18, wherein the data lines have substantially zigzag shape.

* * * * *